United States Patent
Chang

[11] Patent Number: 6,011,649
[45] Date of Patent: Jan. 4, 2000

[54] OPTICAL ASSEMBLY AND METHOD FOR HIGH PERFORMANCE COUPLING

[75] Inventor: Kok Wai Chang, Sunnyvale, Calif.

[73] Assignee: Hewlett-Packard Company, Palo Alto, Calif.

[21] Appl. No.: 08/923,014

[22] Filed: Sep. 3, 1997

[51] Int. Cl.[7] .................................. G02B 5/30; G02F 1/09
[52] U.S. Cl. ......................... 359/484; 359/495; 359/497; 359/282; 385/11
[58] Field of Search .................................... 359/281, 282, 359/484, 495, 497; 372/703; 385/6, 11, 27, 33

[56] References Cited

U.S. PATENT DOCUMENTS

| | | | |
|---|---|---|---|
| 4,464,022 | 8/1984 | Emkey | 350/377 |
| 5,204,771 | 4/1993 | Koga | 359/495 |
| 5,212,586 | 5/1993 | Van Delden | 359/281 |
| 5,319,483 | 6/1994 | Krasinski et al. | 359/113 |
| 5,471,340 | 11/1995 | Cheng et al. | 359/281 |
| 5,574,596 | 11/1996 | Cheng | 359/484 |
| 5,588,078 | 12/1996 | Cheng et al. | 385/33 |
| 5,734,763 | 3/1998 | Chang | 359/497 |
| 5,768,005 | 6/1998 | Cheng et al. | 385/11 |
| 5,768,015 | 6/1998 | Pattie | 359/282 |

FOREIGN PATENT DOCUMENTS

| | | | |
|---|---|---|---|
| 0491607A2 | 6/1992 | European Pat. Off. | G02B 27/10 |

*Primary Examiner*—Ricky D. Shafer

[57] ABSTRACT

An optical assembly, such as a circulator, for selectively coupling first and third input/output windows at a forward end with a second input/output window at a rearward end includes a first group of optical elements that establish a desired orientation of polarization components for first and third beams that are respectively introduced via the first and third windows. In the preferred embodiment, the desired orientation is one in which the orthogonal polarization components of the third beam are shifted to locations on opposite sides of aligned polarization components of the first beam. A second functionally related group of optical elements functions as a polarization-dependent isolator for coupling the first beam to the second window and coupling an input beam from the second window to the rearward face of the first group of optical elements such that a rearwardly propagating beam from the second window is coupled to the third window. In the preferred embodiment, the first group of optical elements includes both a polarization mixer and a polarization combiner. In another embodiment, the first group is a pair of split optical members, with each member having an optically neutral portion and a walk-off portion. In a third embodiment, the first group includes the polarization mixer of the preferred embodiment, but not the polarization combiner.

6 Claims, 7 Drawing Sheets

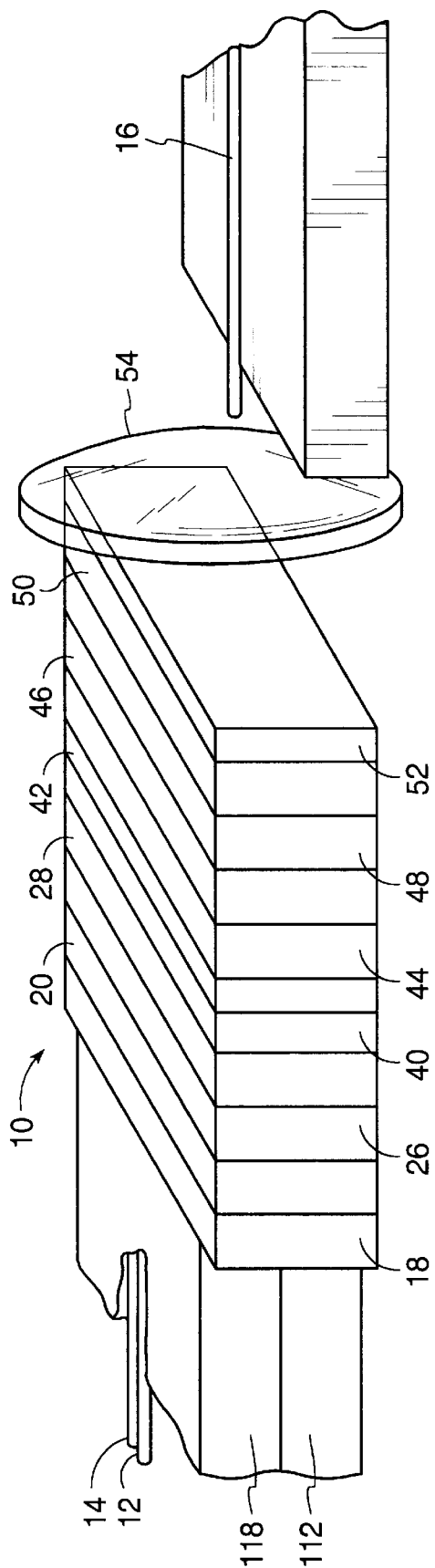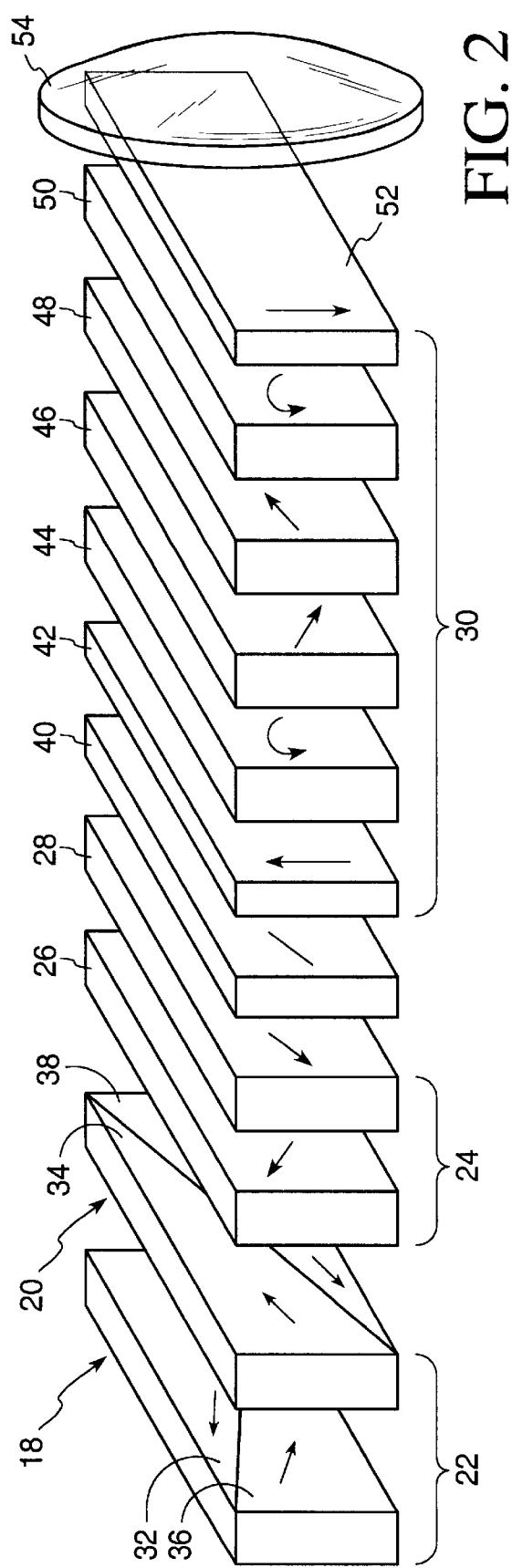

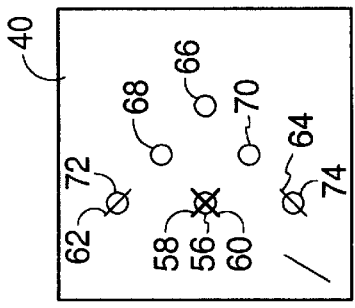
FIG. 7
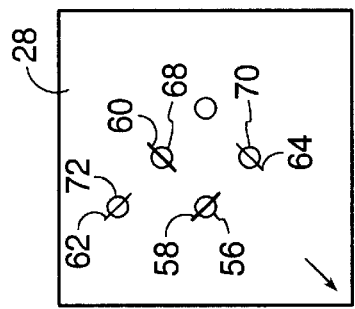
FIG. 6
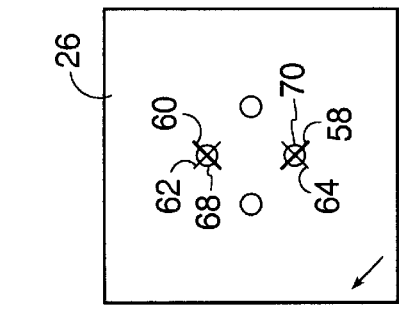
FIG. 5
FIG. 4
FIG. 3
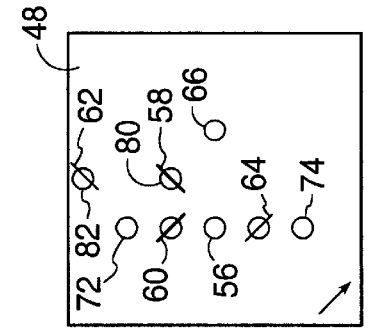
FIG. 11
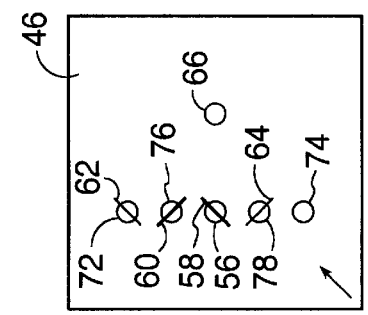
FIG. 10
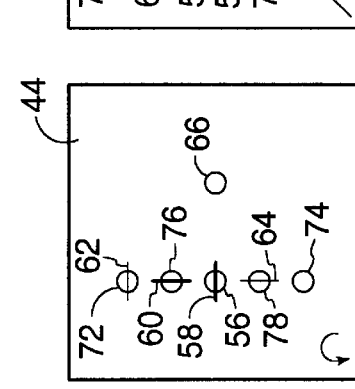
FIG. 9
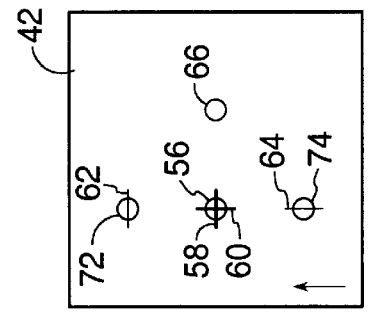
FIG. 8

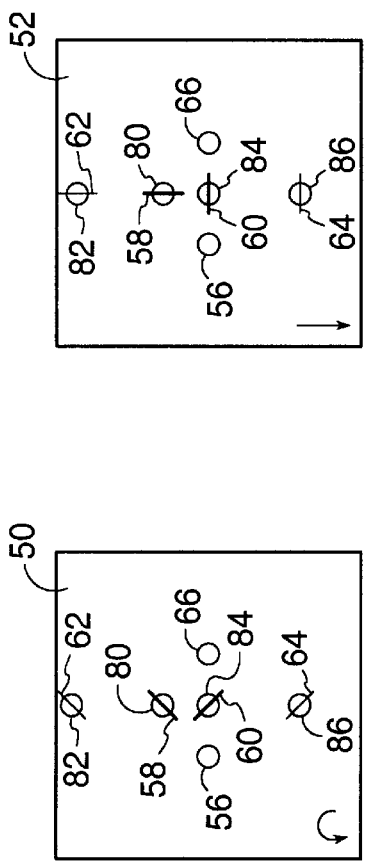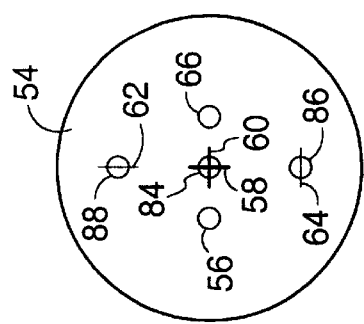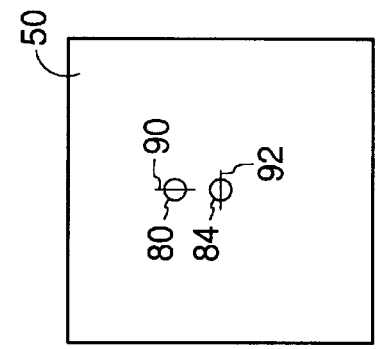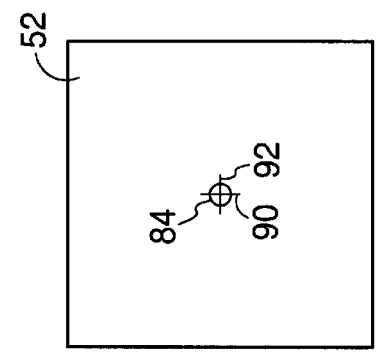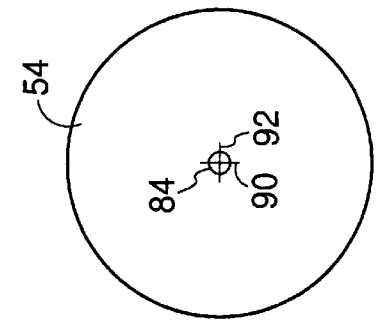

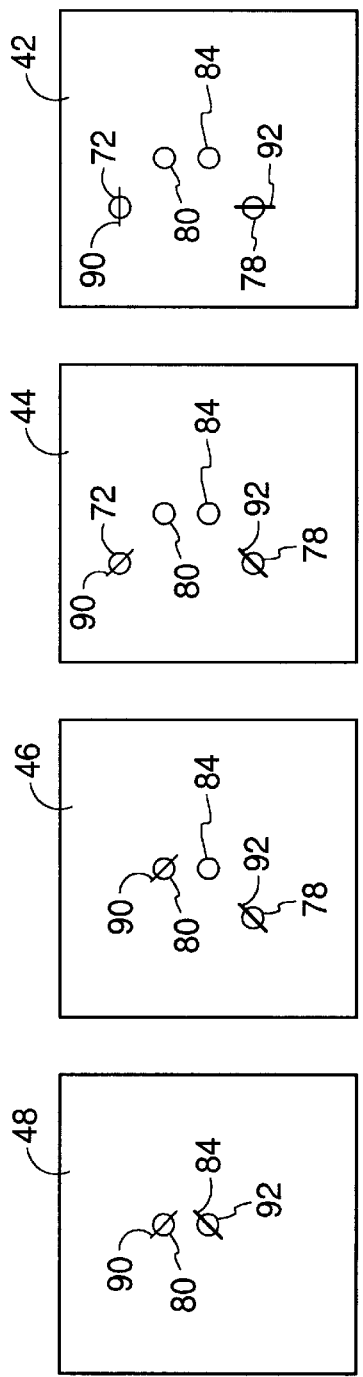
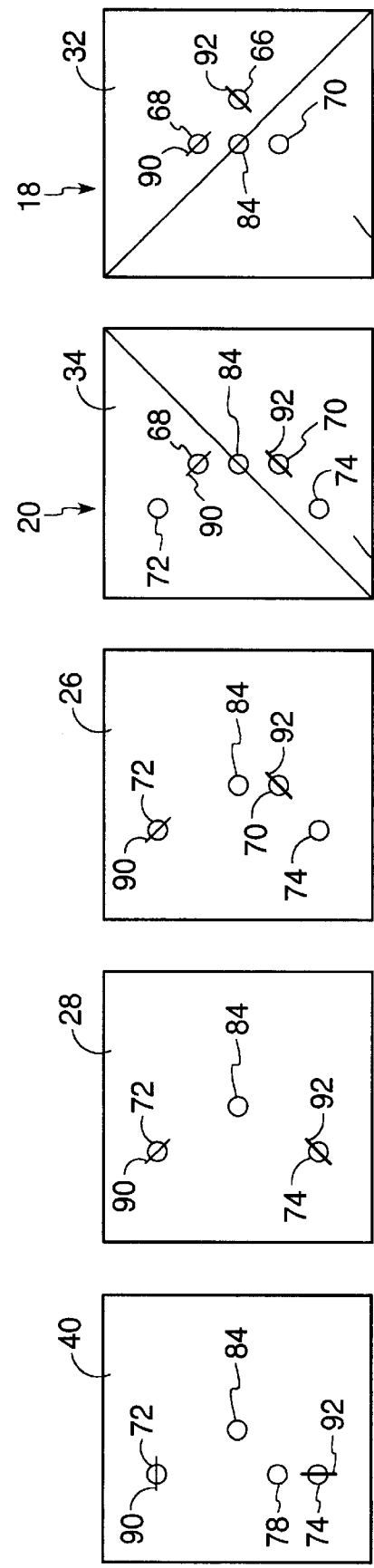

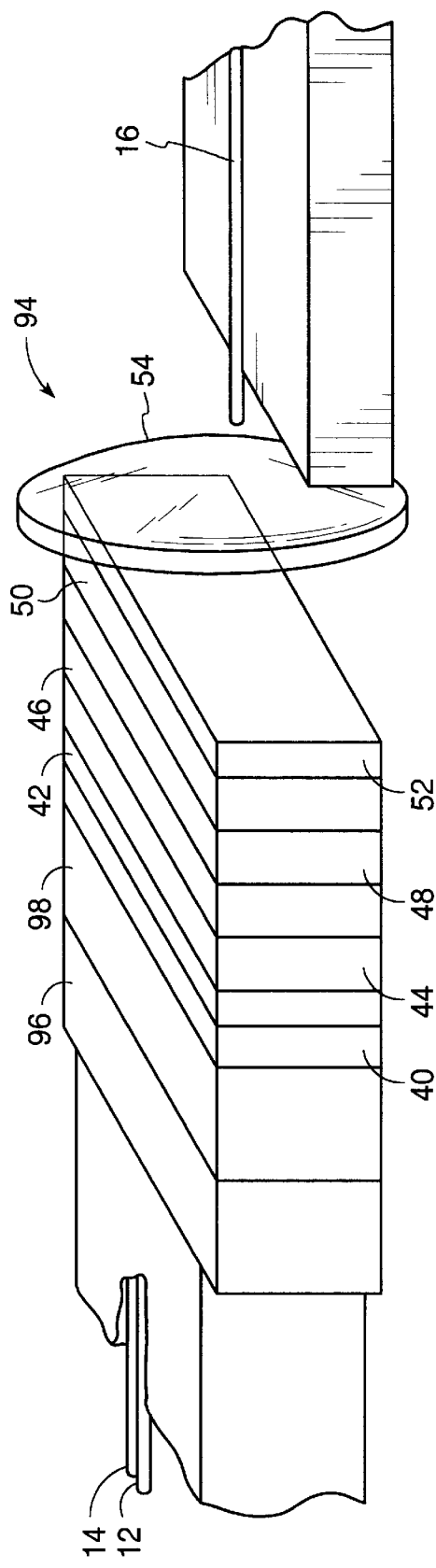
FIG. 27
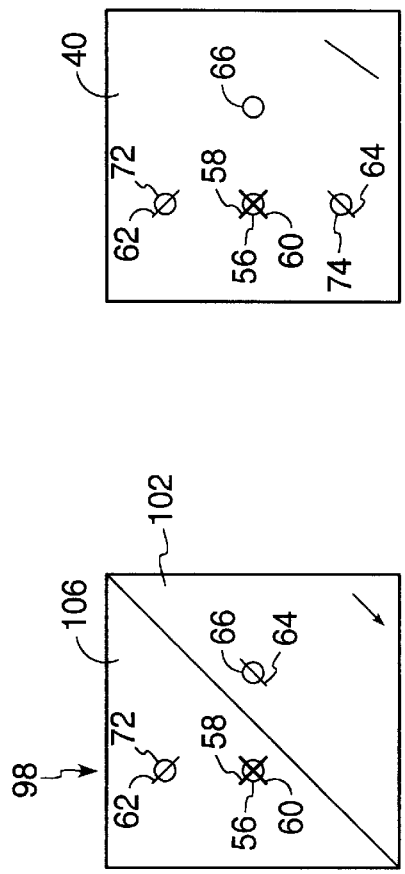
FIG. 30
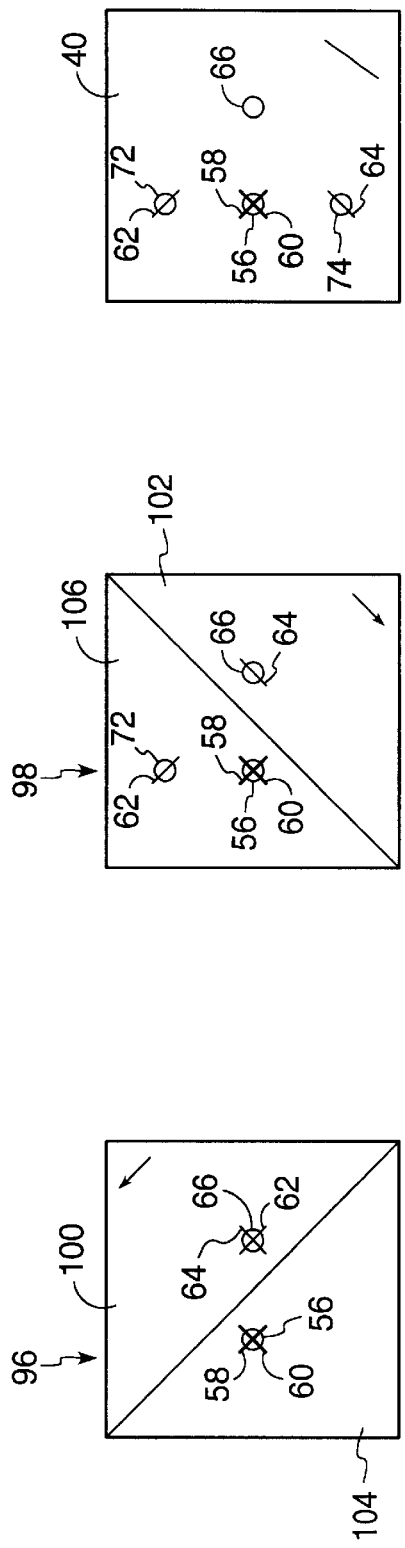
FIG. 29
FIG. 28

OPTICAL ASSEMBLY AND METHOD FOR HIGH PERFORMANCE COUPLING

TECHNICAL FIELD

The invention relates generally to optical assemblies and methods for selectively coupling ports for transmission of signals and more particularly to assemblies and methods for achieving optical circulation and isolation in multi-port systems.

BACKGROUND ART

The flexibility and reliability of communication networks based upon transmissions of light signals via optical fibers are greatly increased by the availability of assemblies such as optical circulators and isolators. For example, a three-port circulator may be used to enable a single fiber to be used for bidirectional communications between two remote sites. By utilizing non-reciprocal optical elements, i.e. elements which affect light moving in different directions differently, a bidirectional fiber may be optically coupled to both an input fiber and an output fiber. Non-reciprocal operations provide differences in the "walk-off," i.e. spatial displacement, of oppositely directed light beams, so that the input and output fibers are optically isolated from each other.

An optical isolator may include only single-mode fibers. The input fiber directs light signals into an optical assembly that splits the light into polarization components, performs non-reciprocal operations on the components, and recombines the components for output at the output fiber. The non-reciprocal operations are designed to reduce the likelihood that back-directed light will be aligned with the input fiber.

U.S. Pat. No. 4,464,022 to Emkey describes an optical circulator that includes a first birefringent plate that is used to separate a beam from a first port into two beams having orthogonal polarizations. The two beams are then recombined by a second birefringent plate positioned at a second port. Between the first and second birefringent plates is a Faraday rotator that provides non-reciprocal rotation of the polarizations. A third birefringent plate and a reflecting element are positioned between the third and second birefringent plates, so that the beams are reflected at a ninety degree angle to the second port. However, the reflecting element has a slotted portion that allows light from a third port to pass through the reflecting element toward the first port. Thus, the first port acts as an input port for transmission of signals via the second port, but acts as an output port for signals from the third port. The ninety degree angle of the second port relative to the first and third ports is designed to maximize the isolation of the second port from the third port. A similar arrangement is described in U.S. Pat. No. 5,212,586 to Van Delden.

There are a number of factors that must be considered in the design of optical circulators and isolators. U.S. Pat. No. 5,319,483 to Krasinski et al. identifies insertion loss and crosstalk as two performance-related design considerations. Insertion loss is the difference in power between input light and the light that exits the optical assembly. The primary causes of insertion loss are identified as absorption of light and imperfections of polarization separation and recombination. Crosstalk in an optical circulator is the transmission of light from an input fiber to a fiber which is not the intended output fiber. Krasinski et al. assert that the primary cause of crosstalk in optical circulators is back-reflection from the various optical elements in the assembly. The system described in the patent utilizes birefringent crystals instead of polarization reflecting elements and polarization splitting cubes in an attempt to provide more complete polarization separation, thereby reducing insertion loss and crosstalk. Moreover, the system is one in which the optical circulators of the assembly are in optical contact with each other, thereby reducing back-reflections.

While known optical circulators and isolators operate well for their intended purposes, further improvements in performance are desired. Another design goal is to increase cost efficiency in the fabrication of optical circulators and isolators.

What is needed is an optical assembly and method for efficiently transferring optical signals within a multi-port system, such that each port is selectively coupled with respect to exchanges of signals among the remaining ports. What is also needed is such an optical assembly that is fabricated cost efficiently.

SUMMARY OF THE INVENTION

An optical assembly, preferably an optical circulator, includes first and third input/output ports at a forward end of the assembly and a second port at a rearward end. A first functionally related group of optical elements is located adjacent to the first and third ports to establish a desired orientation for polarization components of parallel first and third light beams that are respectively introduced via the first and third ports. In the preferred embodiment, the desired orientation is one in which the orthogonal polarization components of the third beam are shifted to locations on opposite sides of the polarization components of the first beam. A second functionally related group of optical elements further isolates the polarization components of the third beam from the propagation of the first beam, which is output via the second port. Reverse propagation of a second beam from the second port directs the second beam to the third port in isolation from the first port. The operation of the first group of optical elements allows an optical isolator (i.e. the second group) to be converted to a cost effective, high performance optical circulator.

In one embodiment, the first group of optical elements includes a polarization mixer that divides the two orthogonal polarization components of the first beam and divides the two orthogonal polarization components of the third beam, and establishes two forward propagation paths in which one polarization component of the first beam is combined with a polarization component of the third beam. This "mixing" of the polarization components is preferably followed by a polarization combiner that re-merges the polarization components of the first beam, but with the two polarization components of the third beam on opposed sides of the recombined first beam. This provides the desired orientation of polarization components for input to the second group of optical elements. The second group of optical elements may be a half-wave plate followed by a two-stage isolator array, but this is not critical.

In another embodiment, the desired orientation of polarization components for propagation into the second group of optical elements is achieved using a first group that comprises forward and rearward split optical members. Each split member includes an optically neutral portion aligned with the optical axis of the first port and includes a walk-off portion that is aligned at the optical axis of the third port. The walk-off portions have perpendicular walk-off directions that displace the two orthogonal polarization components of the third beam to opposite sides of the forward propagating first beam. In this embodiment, the second group of optical elements may be a half-wave plate followed by a two-stage isolator array. However, other arrays that propagate the first beam for output via the second port may be substituted.

In the rearward propagation direction, light is introduced to the second group of optical elements via the second port. The two polarization components of this rearwardly propagating beam are divided by the second optical group and are introduced to the first optical group in the same positions as forwardly propagating polarization components if a beam were introduced from the third port. That is, the spatial displacements of the polarization components of the third beam by operation of the first optical group defines shifted locations of the polarization components, and these shifted locations are coincident with the locations of the polarization components from the rearwardly propagating beam of the second port. The operation of the first optical group on the rearwardly propagating components is the reverse of the operation on the components of the third beam. Consequently, the rearwardly propagating components are recombined for output via the third port.

In the preferred embodiment, the forwardly propagating light from the first beam is focused onto the second port, thereby increasing transfer efficiency. Also in the preferred embodiment, each of the three ports is associated with a thermally expanded core optical fiber, but other input media may be utilized, including standard optical fibers with a microlens assembly.

In the embodiment in which the first optical group includes a polarization mixer, the polarization combiner is not a critical feature. However, the performance of the invention is significantly increased if the polarization combiner is used to establish the "desired orientation" of polarization components, as identified previously. This desired orientation provides a preliminary separation of the first and third beams, so that the isolation can be enhanced at the second optical group. Thus, a high performance optical assembly is achieved.

BRIEF DESCRIPTION OF THE DRAWINGS

FIG. 1 is a perspective view of one embodiment of an optical assembly for selectively coupling three ports in accordance with the invention.

FIG. 2 is a perspective exploded view of the optical assembly of FIG. 1.

FIGS. 3–14 illustrate the operations performed upon polarization components during forward propagation through the assembly of FIGS. 1 and 2.

FIGS. 15–26 illustrate operations performed upon polarization components during rearward propagation through the assembly of FIGS. 1 and 2.

FIG. 27 is a perspective view of a second embodiment of an optical assembly in accordance with the invention.

FIGS. 28–30 illustrate the operations of the first two components of FIG. 27.

DETAILED DESCRIPTION

Figure 31:
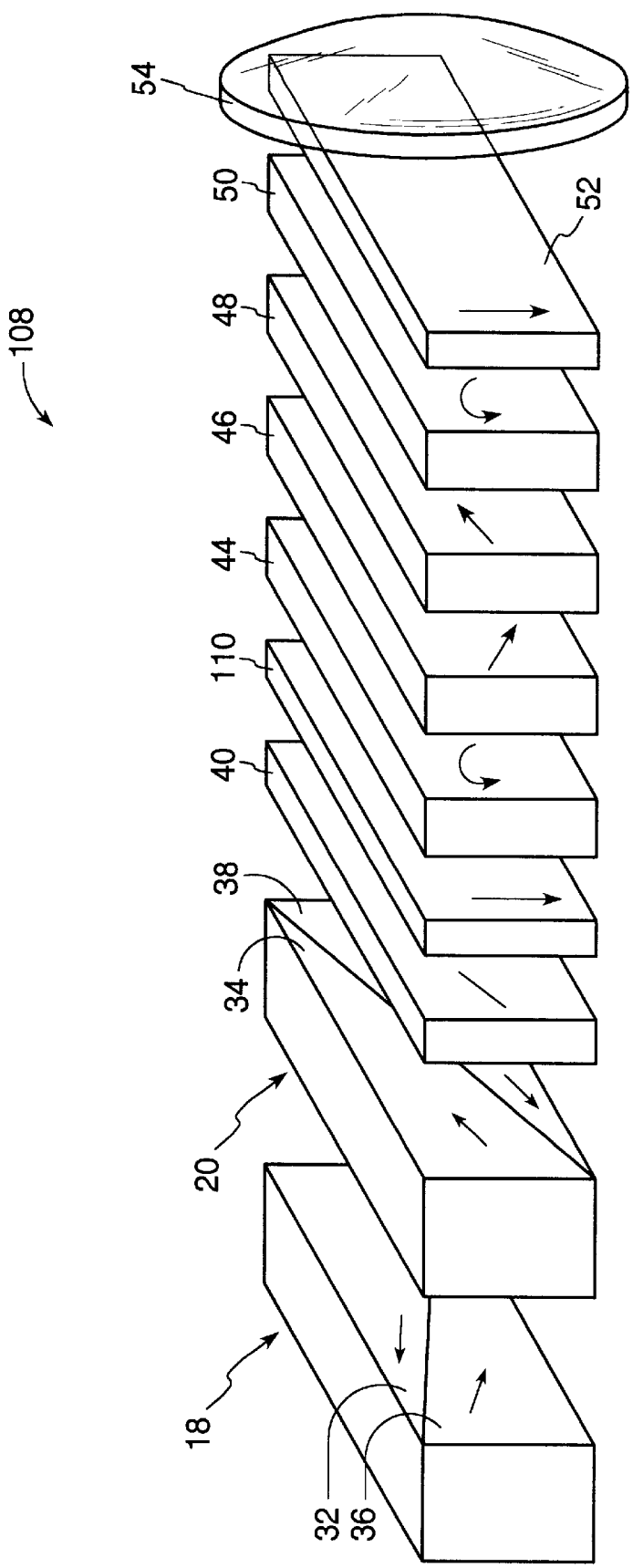
FIG. 31 is a perspective exploded view of a third embodiment of an optical assembly in accordance with the invention.

With reference to FIGS. 1 and 2, an optical assembly 10 is shown as having parallel first and third optical fibers 12 and 14 at a forward end and having a second optical fiber 16 at a rearward end. In the embodiment of FIG. 1, the assembly is an optical circulator in which an input beam from the first fiber 12 propagates through the various optical elements for output via the second fiber 16, while an input signal from the second fiber is output via the third fiber 14. However, all other possibilities of optical coupling among the fibers are blocked by operations of the various elements on the polarization components of the beams from the fibers.

In the embodiment of FIGS. 1 and 2, the first two optical elements 18 and 20 at the forward end of the assembly 10 form a polarization mixer 22. As will be described more fully below with reference to FIGS. 3–14, forward propagation of light beams from the first and third fibers 12 and 14 through the polarization mixer 22 results in two light beams in which each has one polarization component from the beam of fiber 16 and one polarization component from the beam of fiber 14. This "mixing" of polarization components sets the stage for a polarization combiner 24 formed by the third and fourth optical elements 26 and 28 in the assembly 10. The polarization combiner re-merges the two polarization components of the first beam from the first fiber 12 and shifts the two polarization components of the third beam from the third fiber 14 to opposite sides of the re-merged first beam. In turn, this arrangement of the polarization components sets the desired orientation for a two-stage optical isolator array 30 that will be described more fully below. The elements of the assembly 10 combine to form a high performance, cost efficient optical circulator.

As best seen in FIG. 2, the elements 18 and 20 that form the polarization mixer 22 are diagonally divided into upper portions 32 and 34 and lower portions 36 and 38. The interface of the upper and lower portions 32 and 36 of the first element 18 is perpendicular to the interface of the upper and lower portions 34 and 38 of the second element 20. Each of the four portions is formed of a walk-off crystal, and the two portions of each of the two elements have oppositely directed walk-off directions. The walk-off directions are indicated by arrows on the four portions 32–38 in FIG. 2.

The two elements 26 and 28 of the polarization combiner 24 are also formed of walk-off crystal. The walk-off directions are perpendicular to each other, but are directed to the same lateral surface of the assembly 10. As is well known in the art, common materials for forming walk-off crystals are rutile (titanium dioxide-$TiO_2$) and yttrium vanadate ($YVO_4$). The preferred material is rutile, since it provides a greater refractive index. For each one mm of walk-off separation, the rutile crystal must have a thickness of approximately 10 mm. In the embodiment of FIGS. 1 and 2, if the core-tocore pitch of the first and third fibers 12 and 14 is 250 $\mu$m, the preferred walk-off distance may be $\sqrt{2}$ times one-half the pitch. Therefore, the thickness of each of the elements 18, 20, 26 and 28 should be selected to provide a walk-off distance of $\sqrt{2}$ 125 $\mu$m=177 $\mu$m.

The optical element 40 that is at the rearward face of the walk-off crystal 28 is a half-wave plate that provides polarization rotation. The optical axis of the half-wave plate is 22.5 degrees to the vertical, so that rotation of the polarization states is 45 degrees. Half-wave plates are well known in the art.

As previously noted, the following optical elements provide a two-stage isolator array 30. A first element 42 in the array is a walk-off element which may have a thickness to provide a spatial displacement of 125 $\mu$m, but this walk-off distance is not critical to the invention. The walk-off direction is upward, as shown by the arrow in FIG. 2.

The two-stage optical isolator array 30 includes two Faraday rotators 44 and 50 that sandwich a pair of walk-off crystals 46 and 48. Each of the Faraday rotators causes the polarization components of beams to rotate 45°. In the forward direction, the Faraday rotators cause counter-clockwise rotation, as indicated by the arrows. The walk-off crystals 46 and 48 may have a thickness to provide a spatial displacement of 177 μm in the preferred embodiment described above. The walk-off directions are perpendicular to each other, but have a major directional component toward the distant lateral side of the assembly 10, as viewed in FIGS. 1 and 2. The last element 52 of the two-stage isolator array 30 is a walk-off crystal having a walk-off direction that is downward and a walk-off distance of 125 μm. The thickness will depend upon the desired walk-off distance, as previously noted.

The two-stage optical isolator array 30 is followed by an imaging lens 54 that is used to focus the output beam from the first fiber 12 onto the second fiber 16 that is to output the beam. If all of the fibers 12,14 and 16 are thermally expanded core (TEC) fibers, the lens 54 is a one-to-one imaging lens. However, in an embodiment in which the first fiber 12 is a TEC fiber and the second fiber 16 is a conventional single-mode fiber, the lens may be a four-to-one imaging lens. The lens reconverges the polarization components of the first beam from the first fiber 12, which diverge as they pass through the optical assembly 10. The focal length of the lens is selected based upon forming an image of the first beam onto the second fiber 16.

FIGS. 3–14 illustrate forward propagation of polarization components of first and second light beams from the first and second fibers 12 and 14 of FIG. 1. Each of the twelve figures is an illustration of the positions of the polarization components at a forward face of one of the twelve components of FIG. 2. In FIG. 3, the optical axis of the first fiber defines a first port 56, i.e., window, at the forward face of the polarization mixer 22 that is defined by the two split elements 18 and 20. The orthogonal polarization components 58 and 60 of the first beam are illustrated as thickened black lines in FIG. 3. In comparison, polarization components 62 and 64 of the third beam from the third fiber define a window 66 at the forward face of the split element 18.

The optical axis of the first beam is aligned with the lower portion 36 of the first split element 18, while the optical axis of the third beam is aligned with the upper portion 32. As a result of the walk-off operations of the upper and lower portions (the walk-off directions are shown by arrows in FIG. 3), the first polarization component 58 and the third polarization component 62 are shifted to locations 68 and 70 when the forwardly propagating four polarization components 58–64 reach the forward face of the second split element 20, as shown in FIG. 4. The second polarization component 60 and the fourth polarization component 64 are in alignment with the walk-off directions of the upper portion 34 and lower portion 38 of the second element within the polarization mixer. Consequently, the walk-off operations of the two portions 34 and 38 walk-off the second and fourth polarization components to the two shifted locations 68 and 70. This orientation of the four polarization components occurs at the forward face of the walk-off crystal 26 that is the first block of the pair of walk-off crystals that forms the polarization combiner described above. The orientation is shown in FIG. 5.

Comparing FIGS. 3 and 5, the polarization mixer that is formed by the two optical elements 18 and 20 combines one of the polarization components 58 from the first port 56 with one of the polarization components 64 from the second port 66, and the remaining two polarization components are also combined. The "mixed" polarization components are on the forward propagation paths indicated by shifted locations 68 and 70 in FIG. 5.

The walk-off operation of the forward element 56 of the polarization combiner shifts the first polarization component 58 back to the position of the window 56 and shifts the third polarization component 62 to a location 72, as shown in FIG. 6.

FIG. 7 illustrates the four polarization components 58–64 after the second element 28 of the polarization combiner has shifted the second and fourth polarization components 60 and 64. The first and second polarization components 58 and 60 that form the input beam from the window 56 are returned to the original position of FIG. 3, but the third and fourth polarization components 62 and 64 that originally formed the beam at window 66 are at locations 72 and 74 on opposite sides of the window 56 and are isolated from each other by a distance greater than the separation between the original windows 56 and 66.

The four polarization components 58–64 are rotated in place by operation of the half-wave plate 40. The use of half-wave plates is well known in the art. FIG. 8 illustrates the rotated alignment directions of the four polarization components at original window 56 and at shifted locations 72 and 74. The four polarization components are then introduced into the two-stage optical isolator array 30 of FIG. 2.

The first element 42 of the two-stage optical isolator array 30 is the walk-off crystal having the upwardly directed walk-off direction. This causes the vertically oriented second and fourth polarization components 60 and 64 to shift upwardly to locations 76 and 78 in FIG. 9. As previously noted, the thickness of the walk-off crystal 42 is less than the thickness of previously encountered walk-off crystals. For example, the thickness of the crystals 26 and 28 may each be approximately 10×√2 a, while the thickness of the crystal 42 may be approximately 10 a, where "a" is one-half of the pitch between the two windows 56 and 66. In one preferred embodiment, the value of a is 125 μm, so that the walk-off crystals 26 and 28 are each approximately 1,770 μm and the thickness of the walk-off crystal 42 is approximately 1,250 μm. However, the value of a is not critical to the invention.

The four polarization components 58–64 are rotated 45° by Faraday rotator 44 of FIG. 9 to provide the polarization orientation shown in FIG. 10. The walk-off crystal 46 shifts the positions of the first and third polarization components 58 and 62 to locations 80 and 82, respectively. This temporarily places the two polarization components 58 and 60 of the beam that entered at the window 56 in a side-by-side relationship. However, the second walk-off crystal 48 in the pair then shifts the second and fourth polarization components to the locations 84 and 86 shown in FIG. 12.

The second Faraday rotator 50 rotates the polarization orientations of all four components 58–64, so that the polarization components are oriented as shown in FIG. 13 when the components reach the forward face of the walk-off crystal 52. The walk-off direction of the crystal 52 is downward. Consequently, the first and third polarization components 58 and 62 are displaced by a distance determined by the thickness of the crystal 52. For a rutile crystal having a thickness of approximately 1,250μm, the downward shift is equal to approximately a=125 μm. The third polarization component 62 is shifted to location 88. The first polarization component 58 is shifted to the location 84, which corresponds to the optical axis of the second fiber 16 described with reference to FIG. 1. Thus, the polarization components 58 and 60 that were input from the window 56 defined by the first optical fiber 12 (see FIG. 3) are the output signal for the second optical fiber 16. The imaging lens 54 focuses the image onto the second optical fiber. On the other hand, the two polarization components 62 and 64 that are input at the window 66 (see FIG. 3) from the third fiber are isolated each other and from output through the second fiber, as shown by the locations 86 and 88 in FIG. 14.

FIGS. 15–26 illustrate rearward propagation from the second optical fiber 16 to the third optical fiber 14. As previously noted, the location 84 in FIG. 15 corresponds to the port for input/output signals to and from the second fiber. In FIG. 15, polarization components 90 and 92 are shown as the as the components of an input beam from the second fiber. In order to distinguish from the polarization components of the forwardly propagating beams in FIGS. 3–14, the polarization components of the input beam from the second fiber will be referred to as the fifth and sixth polarization components 90 and 92.

The imaging lens 54 allows the fifth and sixth polarization components to pass to the rearward face of the walk-off crystal 52 without effect upon orientation or position, as shown in FIG. 16. However, the walk-off crystal 52 shifts the fifth polarization component upwardly to the position 80 shown at the rearward face of the Faraday rotator 50 in FIG. 17. The Faraday rotator causes the polarizations to rotate 45° to the alignments shown in FIG. 18 at the rearward face of the walk-off crystal 48.

The walk-off crystal 48 displaces the sixth polarization component 92 to the position 78 of FIG. 19. The other walk-off crystal 46 in the pair then shifts the fifth polarization component 90 to the position 72 as the rearwardly propagating beam components reach the rearward face of the Faraday rotator 44 in FIG. 20. The Faraday rotator initiates counterclockwise rotation of the two polarization components 90 and 92 to the orientation shown in FIG. 21 on the rearward face of the walk-off crystal 42.

In FIG. 22, the sixth polarization component 92 has been displaced downwardly by operation of the walk-off crystal 42. The half-wave plate 40 rotates the two polarization components 90 and 92 to the orientation shown in FIG. 23. FIG. 23 shows the interface between the half-wave plate 40 and the polarization combiner 24 of FIG. 2. This interface between the polarization combiner and the half-wave plate is also represented in FIG. 7 for the forwardly propagating polarization components. Comparing FIG. 7 with FIG. 23, it can be seen that the third and fourth polarization components of the beam from the third fiber 14 are identical in position and orientation to the fifth and sixth polarization components 90 and 92 of the rearwardly propagating beam from the second fiber 16. As will be explained immediately below, the final four elements 28, 26, 20 and 18 operate in the inverse to the operations described with reference to FIGS. 3–6. Consequently, the rearwardly propagating polarization components 90 and 92 reach the third fiber 14 for output.

The first walk-off crystal 28 in the polarization combiner pair shifts the sixth polarization component 92 to the position 70 upon reaching the rearward face of the second walk-off crystal 26 in the pair, as shown in FIG. 24. The crystal 26 shifts the fifth polarization component 92 to the position 68 in FIG. 25, as the polarization components reach the rearward face of the polarization mixer pair 22 described with reference to FIG. 2.

The upper portion 34 of the rearward split element 20 has no effect on the fifth polarization component 90, but the lower portion 38 causes the sixth polarization component 92 to be displaced to the window 66 of the third optical fiber, as shown at FIG. 26. While not shown in the drawings, the upper portion 32 of the split elements 18 then shifts the fifth polarization component 90 into alignment with the window 66 for output of the two beam components along the third fiber.

Referring to FIGS. 1–26, the assembly 10 optically couples the first fiber 12 to the second fiber 16 and optically couples the second fiber 16 to the third fiber 14, but isolates the fibers from spurious transmissions.

A similar arrangement is illustrated in FIGS. 27–30. Many of the optical elements of the assembly 94 of FIG. 27 are identical to the assembly 10 of FIG. 1. For these elements, the reference numerals have been duplicated. The half-wave plate and all of the elements 42–52 of the two-stage optical assembly 30 are common to the embodiments of FIGS. 1 and 27. The difference between the two embodiments is that the polarization mixer 22 and the polarization combiner 24 have been replaced by a pair of split optical members 96 and 98. Each of the split optical members includes a walk-off portion 100 and 102 and an optically neutral portion 104 and 106. The optically neutral portions are aligned with the window 56 at the optical axis of the first fiber 12. On the other hand, the walk-off portions are aligned with the window 66 for the third fiber 14.

The forward split optical member 96 has a walk-off portion 100 that shifts the third polarization component 62 in the direction indicated by the arrow within portion 100 in FIG. 28. Consequently, the third polarization component is displaced to the location 72 of FIG. 29. However, the optically neutral portion 104 of the first member 96 allows both of the first and second polarization components 58 and 60 to propagate to the forward face of the second member 98 without effect. The second of the two optically split members 98 displaces the fourth polarization component 64 in the walk-off direction indicated by the arrow in portion 102 of FIG. 29. Referring to FIG. 30, the fourth polarization component 64 is displaced to the location 74 when the beam component reaches the forward face of the half-wave plate 40.

Comparing FIGS. 7 and 30, the four polarization components 58–64 are in identical positions when the beam components reach the forward face of the half-wave plate 40. Consequently, the remaining optical elements 40–54 in the assembly 94 of FIG. 27 will have the identical optical effects described with reference to FIGS. 7–14. Rearwardly propagating light from the second fiber 16 of FIG. 27 will likewise be affected by the components 40–54 in the same manner as described with reference to FIGS. 15–22. Therefore, the fifth and sixth polarization components from the second fiber 16 will reach the rearward face of the split optical member 98 in the same positions 72 and 74 and orientations shown in FIG. 23. The walk-off portions 100 and 102 of the split optical members 96 and 98 displace the rearwardly propagating fifth and sixth polarization components in a manner that is the inverse of the forwardly propagating third and fourth polarization components 62 and 64 in FIGS. 28–30. It follows that the rearwardly propagating fifth and sixth components are optically coupled to the third fiber 14.

The thickness of each of the split optical members 96 and 98 is twice the thickness of any one of the optical members 18, 20, 26 and 28 of the polarization mixer and polarization combiner of FIGS. 1 and 2. If "a" is the distance between the optical axis of an input fiber 12 to the optical axis of an output fiber 16, the thickness of each of the elements 18, 20, 26 and 28 of FIG. 1 should provide a walk-off distance of √2 a. If the core-to-core pitch of the fibers 12 and 14 is 250 μm and the optical axis of the second fiber 16 is centered between the two axes of the fibers 12 and 14, then a=125 μm. The walk-off distance for each of the four elements 18, 20, 26 and 28 of FIGS. 1 and 2 is then √2 125 μm=177 μm. In comparison, each of the walk-off portions 100 and 102 of the split optical elements 96 and 98 of FIGS. 27–30 must provide a walk-off distance of 2 √2 a=353.5 μm.

While the optical assembly 94 of FIG. 27 operates well for its intended purpose, the assembly 10 of FIG. 1 is preferred. The assembly 94 is more susceptible to scattering at the interfaces between the two split optical elements 96 and 98 and between the rearward split optical element 98 and the half-wave plate. This greater concern for interface scattering is a result of the greater thickness of each of the split optical members 96 and 98 relative to the thicknesses of the split elements 18 and 20 of FIG. 1.

A third embodiment is shown in FIG. 31. The optical assembly 108 of FIG. 31 is identical to the assembly 10 of FIGS. 1 and 2, with the exceptions that the polarization combiner 24 has been eliminated and the walk-off crystal 42 of assembly 10 has been replaced with a walk-off crystal 110 having an oppositely directly walk-off displacement. Since all of the other elements of assembly 108 have the same functions and relative positions described with reference to FIGS. 1 and 2, the reference numerals have been duplicated. In addition to the elimination of the polarization combiner and the reversed walk-off direction of crystal 110, the assembly 108 of FIG. 31 requires placement of the optical axis of the second fiber 16 at a level below the optical axes of the first and third fibers 12 and 14. That is, the input/output port at the rearward end of the assembly 108 is at a level below the input/output ports at the forward end of the assembly.

The polarization mixer that is comprised of the split element 18 and 20 functions in the same manner as described with reference to FIGS. 3 and 4. Thus, the polarization components of an input beam from the first fiber will reach the forward face of the half-wave plate 40 in the positions and orientations shown in FIG. 5. All four of the polarization components 58, 60, 62 and 64 are then rotated 45° upon reaching the forward face of the walk-off crystal 110.

The walk-off crystal 110 displaces the second and fourth polarization components downwardly. At the forward face of the Faraday rotator 44, the four polarization components are aligned as shown in FIG. 9, but each component is diagonally shifted downwardly and to the right. That is, the second polarization component 60 is centered between the two windows 56 and 66, with the third polarization component 62 immediately above this position and the first polarization component 58 immediately below this position. The fourth polarization component 64 is positioned immediately below the first polarization component, so that all four components are spaced apart along a vertical plane between the two windows 56 and 66.

The optical elements 44, 46, 48, 50, 52 and 54 operate identically to the manner described with reference to FIGS. 9–14. Consequently, the four polarization components 58-64 reach the forward face of the imaging lens 54 diagonally shifted downwardly and to the right relative to the position shown in FIG. 14. The input/output window for the second fiber is immediately below the window 66.

The optical assembly 108 of FIG. 31 operates well for its intended purpose, but the absence of the polarization combiner 24 of FIGS. 1 and 2 increases the angular sensitivity of the half-wave plate 40. For this reason, the optical assembly 10 of FIGS. 1 and 2 is preferred.

Figure 32:
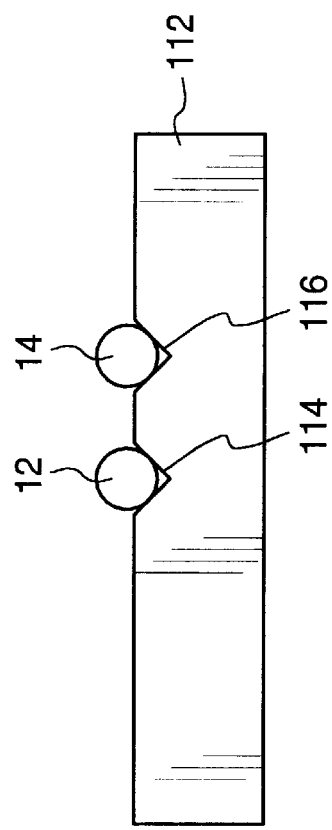
FIG. 32 is an end view of a silicon substrate to sandwich TEC fibers into precisely defined positions.
Figure 33:
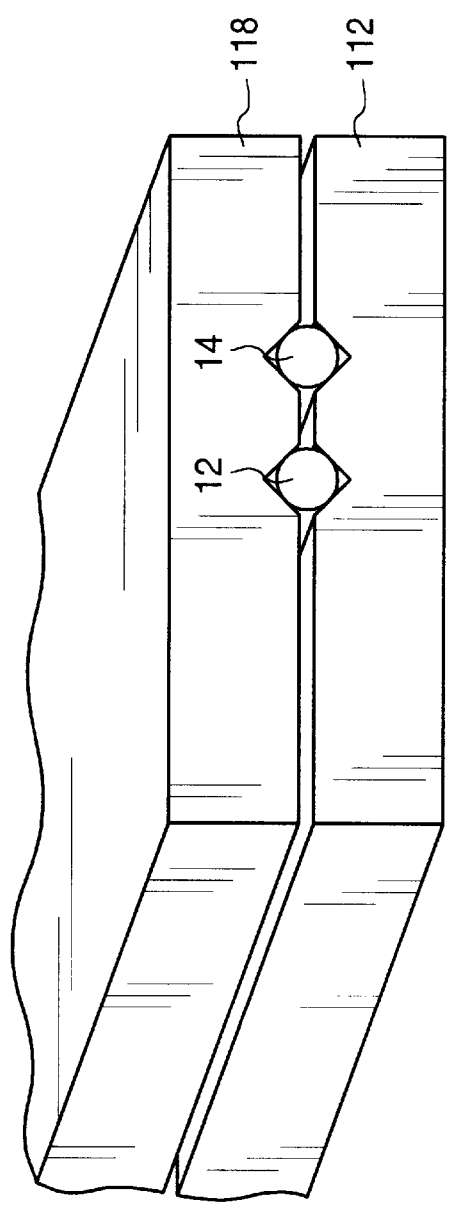
FIG. 33 is a partial perspective view of the silicon wafer of FIG. 32 having a second silicon substrate to fix the TEC fibers into position.

While not critical, the preferred embodiment also utilizes TEC fibers. A preferred method of properly aligning the TEC fibers 12 and 14 is shown in FIGS. 32 and 33. A semiconductor substrate, such as a silicon wafer 112, is etched to form V-shaped grooves 114 and 116. Conventional integrated circuit fabrication techniques may be utilized. For example, the grooves may be formed photolithographically, using a mask to define the grooves and using a chemical etchant. While not critical, the angle of one wall of a groove relative to the other is preferably 70.5°. TEC fiber cores without conventional coating material are then placed in the grooves. The silicon processing enables a precise center-to-center spacing of the fiber cores. Tolerances of less than 1 micron are achieved.

In FIG. 33, a second silicon wafer 118 having a corresponding array of V-shaped grooves is fixed to the lower silicon wafer 112 by a layer of adhesive, not shown. The use of adhesive is not critical. Alternatively, wafer bonding may be used to attach the two silicon wafers. Silicon V-shaped alignment of single-mode fibers and multi-mode fibers is known in the art, and assemblies of the type shown in FIG. 33 are commercially available.

What is claimed is:

1. An optical assembly for selectively coupling ports that include first and third ports at a forward end of said optical assembly and a second port at a rearward end opposite to said forward end, said optical assembly comprising:

a polarization mixer means for establishing propagation paths for orthogonal polarization components of beams introduced from said first and third ports such that forward propagation paths of first and second orthogonal polarization components of said beam from said first port are spaced apart while being respectively coincident with spaced-apart forward propagation paths of third and fourth orthogonal polarization components of said beam from said third port; and an array of optical elements having a forward face positioned adjacent to said polarization mixer means such that said forward propagation paths are incident to said forward face, said array including at least two walk-off elements which are dependent upon polarization directions of said polarization components, said array having combined walk-off properties for said first, second, third, and fourth polarization components to align said first and second polarization components with said second port, said array including a polarization combiner means at said forward face of said array for shifting forward propagation paths of said polarization components such that shifted forward propagation paths of said first and second polarization components are coincident and are spaced apart from shifted forward propagation paths of said third and fourth polarization components, said polarization combiner means including a pair of walk-off elements.

2. The optical assembly of claim 1 wherein said array of optical elements has walk-off properties with respect to a rearward beam introduced from said second port such that orthogonal fifth and sixth polarization components of said rearward beam are separated and reach said polarization mixer means with each of said fifth and sixth polarization components aligned with the forward propagation paths of said third and fourth polarization components having a corresponding polarization orientation, said array of optical elements and said polarization mixer means thereby forming an optical circulator for which said first port is optically coupled to said second port and for which said second port is optically coupled to said third port.

3. The optical assembly of claim 1 further comprising an imaging lens positioned to focus said first and second polarization components onto said second port.

4. The optical assembly of claim 1 wherein said polarization mixer means includes forward and rearward split walk-off members, each of said split walk-off members having first and second portions with opposed walk-off directions, said walk-off directions of the forward split walk-off element being perpendicular to said walk-off directions of the rearward split walk-off member.

5. The optical assembly of claim 1 wherein each of said first, second, and third ports is associated with a thermally expanded core (TEC) fiber.

6. An optical assembly for selectively coupling ports that include a first port and a third port at a forward end of said optical assembly and a second port at a rearward end opposite to said forward end, said optical assembly comprising:

a polarization mixer for establishing propagation paths for orthogonal polarization components of beams introduced from said first and third ports such that forward propagation paths of first and second orthogonal polarization components of said beam from said first port are spaced apart while being respectively coincident with spaced-apart forward propagation paths of third and fourth orthogonal polarization components of said beam from said third port; and an array of optical elements having a forward face positioned adjacent to said polarization mixer such that said forward propagation paths are incident to said forward face, said array including at least two walk-off elements which are dependent upon polarization directions of said polarization components, said array having combined walk-off properties for said first, second, third, and fourth polarization components to align said first and second polarization components with said second port, said array including at least two Faraday rotators, such that at least one Faraday rotator is located between said two walk-off elements, said array being a two-stage optical isolator.

* * * * *